United States Patent
Pol et al.

(10) Patent No.: US 10,668,645 B2
(45) Date of Patent: Jun. 2, 2020

(54) PROCESS FOR THE ACETYLATION OF WOOD

(71) Applicant: Tricoya Technologies Ltd, London (GB)

(72) Inventors: Bernardus Jozef Maria Pol, London (GB); Theodorus Gerardus Marinus Maria Kappen, London (GB)

(73) Assignee: Tricoya Technologies Ltd., Windsor Berkshire (GB)

( * ) Notice: Subject to any disclaimer, the term of this patent is extended or adjusted under 35 U.S.C. 154(b) by 283 days.

(21) Appl. No.: 15/326,194

(22) PCT Filed: Jul. 16, 2015

(86) PCT No.: PCT/EP2015/066317
§ 371 (c)(1),
(2) Date: Jan. 13, 2017

(87) PCT Pub. No.: WO2016/008995
PCT Pub. Date: Jan. 21, 2016

(65) Prior Publication Data
US 2017/0203467 A1    Jul. 20, 2017

(30) Foreign Application Priority Data

Jul. 16, 2014    (EP) .................................. 14177290

(51) Int. Cl.
| | | |
|---|---|---|
| *B27K 3/08* | (2006.01) |
| *B27K 3/36* | (2006.01) |
| *B27K 3/02* | (2006.01) |
| *B27K 3/34* | (2006.01) |
| *C08H 8/00* | (2010.01) |
| *B27K 5/00* | (2006.01) |
| *C08B 3/06* | (2006.01) |

(52) U.S. Cl.
CPC ............ *B27K 3/0278* (2013.01); *B27K 3/346* (2013.01); *B27K 5/001* (2013.01); *C08B 3/06* (2013.01); *C08H 8/00* (2013.01)

(58) Field of Classification Search
CPC ...... B27K 3/0278; B27K 3/346; B27K 5/001; C08B 3/06; C08H 8/00
See application file for complete search history.

(56) References Cited

FOREIGN PATENT DOCUMENTS

| | | |
|---|---|---|
| WO | 2009095687 A1 | 8/2009 |
| WO | 2012037481 A1 | 3/2012 |
| WO | 2013117641 | 8/2013 |
| WO | 2013139937 A2 | 9/2013 |
| WO | WO-2013139937 A2 * | 9/2013 ............... C08H 8/00 |

OTHER PUBLICATIONS

Zauer, M., et al. "Analysis of the pore-size distribution and fiber saturation point of native and thermally modified wood using differential scanning calorimetry," Wood Science and Technology, vol. 48, No. 1, Oct. 25, 2013, XP066166724 ISSN: 0043-7719, DOI: 10.1007/s00226-013-0597-9 table 2.

* cited by examiner

*Primary Examiner* — Alexander M Weddle
(74) *Attorney, Agent, or Firm* — OspreyIP, pllc; James R. Cartiglia

(57) ABSTRACT

Disclosed is a process for the acetylation of wood, wherein the wood is impregnated with acetylation fluid and heated in stages. It is thereby secured that an acetylation reaction is conducted at a temperature above the boiling temperature of the acetylation fluid, at a stage where the impregnated wood is largely devoid of free acetylation fluid (i.e., acetylation fluid not retained in the wood matrix or in capillaries). Preferably, the process is conducted in a plant having conveyors, such as transportation screws, in the zones in which the separate heating steps are conducted.

16 Claims, No Drawings

PROCESS FOR THE ACETYLATION OF WOOD

FIELD OF THE INVENTION

The invention relates to the acetylation of a wood based material (lignocellulosic material). Particularly, the present invention is in the field of acetylation of wood and pertains to a process allowing high acetyl contents to be obtained.

BACKGROUND OF THE INVENTION

In order to produce wood-based materials with a long service life, it has been known to chemically modify the wood and in particular to acetylate the wood. Thereby materials with improved material properties, e.g. dimensional stability, hardness, durability, etc., are obtained. Wood mentioned throughout the description is selected from the group consisting of wood elements and solid wood.

Processes for the acetylation of wood elements, such as chips, embody particular challenges. These are generally different from the challenges encountered when acetylating solid wood, such as beams. Issues relate to the desired homogeneity of the acetylation, to the preference of providing a continuous acetylation process, and to the amount of the acetylation obtained. In both cases of wood elements and solid wood, obtaining of acetylated wood with a high acetyl content is a challenge.

A background reference on the acetylation of wood elements is WO2011/95824. Therein a two stage process is disclosed for the acetylation of wood elements in which the elements are treated with acetic anhydride (i.e. an impregnation step) and then further heated with an inert gas so as to complete acetylation (an acetylation step). As an optional first step, prior to the introduction of acetic anhydride, a vacuum may be applied to the elements to remove resident gases.

The impregnation with acetylation fluid of wood elements under vacuum is also addressed in WO 2013/139937. Therein a process is disclosed that judiciously combines a technique for batch-wise impregnation in such a way that the subsequent acetylation can be conducted in a continuous manner. Another background reference, also disclosing a two-step process, is U.S. Pat. No. 5,608,051.

It is notoriously difficult to obtain high acetylation degrees for wood. In WO 2013/139937 this is successfully addressed with a focus on the impregnation step. However, it would also be desired to further optimize the acetylation step. One desire in this respect is to improve the acetylation content. Another such desire is to provide a still better controlled acetylation process. Yet another such desire is to provide a novel alternative for existing acetylation processes.

SUMMARY OF THE INVENTION

In order to better address one or more of the foregoing desires, the invention presents, in one aspect, a process for the acetylation of wood, the process comprising the following steps:
(a) providing wood with acetylation fluid;
(b) subjecting the wood, in the presence of the acetylation fluid, to a first heating step so as to initiate acetylation, without substantial evaporation of acetylation fluid;
(c) subjecting the impregnated wood, as heated in said first heating step, to a second heating step so as to substantially remove the free fraction of the acetylation fluid, below or at the boiling temperature of free acetylation fluid;
(d) subjecting the impregnated wood, as heated in said second heating step, to a third heating step, at a temperature above the boiling temperature of free acetylation fluid.

In another aspect, the invention concerns a process for the acetylation of wood, the process comprising the following steps:
(a) providing a stream of impregnated wood at or below the boiling temperature of free acetylation fluid, said stream comprising impregnated wood which contains substantially no free liquid, which have a Liquid Content (LC) 20-40 wt. %, and which have an Acetyl Content (AC) of at least 14%;
(b) heating the stream of impregnated wood to a temperature above the boiling temperature of free acetylation fluid.

In yet a further aspect, the invention provides a plant for the acetylation of wood, said plant comprising a contacting section and, downstream of the contacting section, an acetylation reaction section, wherein the acetylation reaction section comprises three reaction zones connected in series, each of said reaction zones comprising a wood conveying device, wherein controls are provided allowing the independent setting of the temperature and pressure in each reaction zone.

DETAILED DESCRIPTION OF THE INVENTION

The invention, in a broad sense, is based on the judicious recognition that an optimal acetylation process for wood can be realized by including a reaction stage wherein impregnated wood is made to have a reduced content of free acetylation fluid, prior to furthering the acetylation reaction at temperatures above the boiling point of said free acetylation fluid.

The term "free acetylation fluid" indicates the fraction of acetylation fluid that is not retained in capillaries or in the wood matrix. In other words, this free acetylation fluid is the fraction of the acetylation fluid added to the wood during impregnation, that is susceptible of evaporation at atmospheric boiling conditions.

Accordingly, in the process of the invention, a heating step is included (viz., the second heating step) wherein the free fraction of the acetylation fluid is made to evaporate, at a temperature around the dew point of the free bulk liquid mixture of acetylation fluid, typically occurs below or at the boiling point of such free acetylation fluid. Only thereafter, in the third heating step, further heat is applied so as to allow wood temperatures to occur which would not be attainable when any free acetylation fluid would be present. Irrespective of whether any free acetylation fluid could still be present, said boiling temperature is defined with reference to the boiling point of free acetylation fluid. As the skilled person will understand, the actual boiling temperature of acetylation fluid once retained in small capillaries in the wood may not be subject to boiling even at the boiling point of the fluid concerned. For the sake of clarity and guidance to the skilled person, the third heating step is defined with reference to the boiling point or the dew point of "free" acetylation fluid, even if any such free fluid may no longer be present. Evidently, the skilled person will be aware of the boiling and dew points of the acetylation fluid (in, respectively, a liquid and a gas state).

The heating in the second step, which serves to achieve the substantial removal of the free fraction of the acetylation fluid, is to be conducted without substantial boiling of acetylation fluid. Accordingly, this step is preferably conducted at a temperature within a range of from −5° C. to +30° C. relative to the dew point of the acetylation fluid. More preferably the temperature at this stage is between +10° C. and +20° C. above dew point of the free bulk liquid.

Without wishing to be bound by theory, the present inventors believe that an important result from the second heating step is that the remaining liquid content (LC) of the wood is as high as necessary (to eventually achieve a good degree of acetylation), but as low as possible (so as to avoid the substantial presence of free acetylation fluid that would be boiling once subjected to the temperatures of the third heating step at near atmospheric pressure).

Generally, the second heating step will end with a liquid content (LC) of 20-40 wt. %, more preferably 25-35 wt. %. More preferably, the liquid content is within a range from 10% below to 10% above the Fiber Saturation Point (FSP), i.e. LC=FSP±10%. This will particularly amount to a range of 27% to 33%. Still more preferably, the second heating step ends with wood having a liquid content satisfying the formula LC=FSP±5%, e.g. 28.5%-31.5% (noting that the FSP will differ per wood species).

In this specification the liquid content relates to the total liquid content in the wood. In practice, where acetic anhydride is used as (part of) the acetylation fluid, the liquid content would typically only be the content of the acetylation fluid, because any residual water in the wood would be converted to acetic acid. The LC can easily be determined by a skilled person by weighing a sample of wood with and without a liquid (e.g. after drying in an oven to a constant weight). The LC of 20-40 wt. % and more preferably the LC of about the FSP as described above, corresponds to substantially no free acetylation fluid in the system.

The FSP is determined according to the following test. A sample of water-impregnated wood is dried in a furnace at 75° C. with a relative humidity of 90-95%. The dimension and weight of the sample are followed during the drying; at the point where the low shrinkage rate transfers to a higher shrinkage rate the moisture content of the sample indicates the FSP.

The foregoing serves to optimize the input of wood, with acetylation fluid, for the eventual high temperature stage of the acetylation process. It will be understood that, in the aforementioned process, said input is initially determined by impregnation. Thereby the first heating step serves to achieve a reasonably high acetyl content (AC), without substantial evaporation of acetylation fluid. The purpose of avoiding substantial evaporation, is to initially retain a sufficient volume of acetylation fluid to allow the fluid to be taken up by the wood, i.e. entering into the wood matrix or in small capillaries. In one embodiment, the first heating step can be conducted when impregnating the wood. In that case the step of providing the impregnated wood will take place simultaneously with the first heating step. In another embodiment, the impregnation of the wood takes place separately, and prior to subjecting the impregnated wood to the first heating step.

It will be understood, that the temperature applied in the first heating step is sufficiently high for acetylation to take place at a substantial level. I.e., a temperature is applied in a range above a temperature that acetylation would be expected to occur (typically above 90° C., although other acetylation threshold temperatures may be applicable), and below the evaporation temperature of the acetylation fluid.

An advantage of the present invention is that the process does not require increased pressure and that any of the heating steps (or any combination of the heating steps), and preferably all the three heating steps, can be carried out at a nearly atmospheric or atmospheric pressure. The pressure is preferably in the range −0.40 barg to 3 barg, more preferably from −0.2 barg to 1 barg and yet more preferably from −0.1 to 0.5 barg.

In the foregoing, it is sometimes spoken of events that occur "substantially." This will generally be clear to the skilled person, who will understand that the terms "substantial" or "substantially" generally indicate something occurring to a recognizable extent, but not necessarily completely. Thus, the first heating step occurring without the substantial evaporation of acetylation fluid, means that a recognizable amount of acetylation fluid may be evaporated, but not all, and not necessarily the majority thereof. Generally, less than 50% by weight is removed, preferably less than 25%, more preferably less than 15% and most preferably less than 5%. In the second heating step the substantial removal of the free fraction of the acetylation means that a recognizable amount of free acetylation fluid is evaporated, but not necessarily all, and not necessarily the majority thereof. The substantial amount evaporated is generally an amount above 5%, preferably above 10%, more preferably above 25%, and most preferably above 50%. Before entering a heating step above the boiling temperature of free acetylation fluid, the present invention provided wood that contains substantially no free liquid. This generally means less than 5 wt. % of free liquid, preferably less than 2 wt. %, more preferably less than 1 wt. %. Most preferably, the amount of free liquid is zero, or as close to zero as possible.

The invention also includes an acetylation process conducted on the basis of pre-treated wood as is obtainable by the first and second heating steps mentioned above. In this process a stream is provided of wood elements or solid wood that satisfy the following requirements:

they are impregnated with acetylation fluid;
they are at or below the boiling temperature of free acetylation fluid; preferably within a range of −5° C. to +30° C. relative to the dew point of the free bulk liquid acetylation fluid, preferably between +10° C. and +20° C. relative to said dew point;
they are substantially devoid of free liquid acetylation fluid (typically containing substantially no free liquid, preferably less than 2 wt. %, and more preferably between 0 wt. % and 1 wt. % thereof;
they have a Liquid Content (LC) of 20-40 wt. %, preferably 25-35 wt. %;
they have an Acetyl Content (AC) of at least 14%, preferably 14-20%, more preferably 16-19%, most preferably 17-18.5%.

In the invention, a stream of these wood elements or solid wood is heated to a temperature above the boiling temperature of free acetylation fluid.

An advantage of the acetylation process of the invention, is that it can be conducted so as to optimize the acetylation itself. As a result, relatively high acetyl contents can be achieved irrespective of how the initial impregnation is conducted. However, it is preferred, particularly when the highest possible acetyl contents are desired, to combine the acetylation process of the invention with Bethel type, impregnation.

Thus, the impregnated wood is preferably provided by a Bethel type impregnation process. Therein, the wood is placed in a vacuum chamber and vacuum is applied to draw air from the wood. Active ingredients (in the present invention: an acetylation fluid) are then added to the chamber under vacuum. After filling the chamber with liquid a pressure generally up to 250 pounds per square inch (psi) can be applied, preferably 150 psi to 200 psi. The pressure is removed so that the wood is again subject to atmospheric pressure. This type of process is preferred, since it should normally result in a maximum impregnation load, which is believed to have a direct relation to a desired maximum acetyl level.

In the event that maximum acetylation fluid uptake after impregnation is not a primary goal, more economical impregnation processes can also be used. Examples thereof, known to the person skilled in the art of wood impregnation, are the so-called Lowry and Rueping processes. These processes require no initial vacuum. Instead, the impregnation fluid is forced deep into the wood under pressure. The compressed gas inside the wood then expands when the pressure is released, causing any excess preservative to be forced out of the wood.

Also methods different from the Lowry or Rueping processes can be used, such as spraying methods. The latter is typically used in fully continuous wood acetylation processes, which have as one of their drawbacks that relatively low acetyl levels are obtained.

In a preferred embodiment, the acetylation process of the present invention is applied to the impregnation and acetylation methods disclosed in the aforementioned WO 2013/139937.

It should be noted that in determining wood acetylation degrees, two different approaches exist in the field. One is based on WPG (Weight Percentage Gain). WPG compares a sample before and after acetylation treatment, and as a result any substances added (and any residues still present in the wood) increase the value. WPG is explained in the following formula: $WPG=(M_{increase}/M_{sample\ before\ reaction}) \times 100\%$. Herein M stands for mass, and $M_{increase}=M_{sample\ after\ reaction}-M_{sample\ before\ reaction}$).

The other approach, is to actually measure the acetyl content (AC). This is given as $AC=(M_{acetyls}/M_{sample\ after\ reaction}) \times 100\%$. Typically HPLC (high-pressure liquid chromatography) can be used to quantify the acetate ion concentrations resulting from the saponification of acetyl groups from the wood. From this the overall mass of the acetyl groups after acetylation can be taken as $M_{acetyls}$.

The different results for WPG and AC can be explained with reference to the following theoretical example: a sample of, e.g., 1 g of wood is acetylated and after the reaction has a mass of 1.25 g. Thus $M_{acetyls}$ is 0.25 g. The resulting WPG is: $(1.25-1.00)/1.00 \times 100\% = 25\%$. Calculated as acetyl content, AC is $=(1.25-1.00)/1.25 \times 100\% = 20\%$.

Hence, care should be taken not to directly compare degrees of acetylation expressed in WPG with degrees of acetylation expressed in AC. In the present description AC values are elected to identify the degree of acetylation.

The wood to be impregnated by the process of the invention is either wood elements or solid wood. The wood elements can preferably be, e.g., wood chips, wood strands, wood particles. The process can however equally be applied to solid wood. The process and plant of the invention can be used for the impregnation, and acetylation, of durable and non-durable hardwoods, as well as durable and non-durable softwoods. The wood preferably belong to non-durable wood species such as soft woods, for example, coniferous trees, typically spruce, pine or fir, or to non-durable hardwoods. Preferred types of wood are spruce, sitka spruce, maritime pine, scots pine, radiata pine, eucalyptus, red alder, European alder, beech and birch.

Typical dimensions of wood elements as defined in accordance with the present invention are given in the following table.

TABLE

| wood element | length (mm) from | length (mm) to | width (mm) from | width (mm) to | thickness (mm) from | thickness (mm) to |
|---|---|---|---|---|---|---|
| Chips | 5 | 75 | 5 | 50 | 1.5 | 25 |
| Strands | 20 | 120 | 5 | 40 | 0.25 | 1.5 |
| splinters (slivers) | 5 | 75 | 0.15 | 0.5 | 0.15 | 0.5 |
| Particles | 1.5 | 20 | 0.15 | 5 | 0.15 | 5 |
| Fibre bundles | 1.5 | 25 | 0.15 | 0.5 | 0.15 | 0.5 |
| Fibres | 1 | 5 | 0.05 | 0.1 | 0.05 | 0.1 |

In some embodiments, the wood elements have a length 1.0-75 mm, a width of 0.05-75 mm and a thickness of 0.05-15 mm.

In alternative embodiments, the wood is solid wood and preferably has a length or width of at least 8 cm. The thickness preferably is at least 20 mm. In some embodiments, the wood has a width of 2 cm to 30 cm, a thickness of 2 cm to 16 cm and a length of from 1.5 to 6.0 m.

Although the process of the invention is equally applicable to solid wood and wood elements, the benefits of the process of the invention are exhibited to the greatest extent in the event of wood chips, strands, or particles. Most preferably, the wood elements are wood chips. Wood elements of a single size range are preferred to facilitate a homogeneous mass flow.

Before impregnation, preferably, wood with a moisture content of less than 15% by weight is provided. This can be achieved by pre-drying wood having a higher moisture content. The pre-drying can be done in a continuous or batch process by any method known in the wood industry. Preferably, the moisture content of the wood is less than 8%, more preferably in a range of from 0.01% to 5%, still more preferably in a range of from 0.5% to 4%.

In a preferred embodiment, heated wood is provided to the vacuum chamber. In that case, the temperature of the wood will preferably be of from 50° C. to 110° C., preferably of from 60° C. to 90° C.

During impregnation the wood is contacted with the acetylation fluid allowing sufficient uptake of the fluid by the wood for subsequent acetylation. The acetylation fluid preferably comprises acetic anhydride and/or acetic acid, and preferably a mixture of acetic anhydride and acetic acid. In a preferred embodiment, the acetylation fluid contains 40-100 wt. % acetic anhydride and 0-60 wt. % acetic acid. Within this range a mixture of 75-95 wt. % acetic anhydride and 5-25 wt. % acetic acid has been found to be beneficial.

A preferred temperature range during impregnation is from 20° C. to 180° C. The wood to fluid ratio is preferably at least 1 to 4. In the case of an anhydride/acid mixture having an excess of anhydride, a preferred temperature is 60° C. to 90° C. A preferred temperature range during the second stage is at or around the dew point, as discussed above. Heating in the third stage is at a higher temperature, but should preferably be not too high, in view of drying-out of the wood. The skilled person will know how to balance desired reaction kinetics against drying out. A preferred temperature range at the acetylation stage is 150° C. to 190° C., preferably 160° C. to 180° C.

At least the second and third heating steps are conducted in a reaction chamber. Optionally, also the first heating step is conducted in a reaction chamber.

A reaction chamber is a vessel, a reactor, or otherwise any device suitable to subject wood, impregnated with acetylation fluid, to reaction conditions that bring about acetylation of the wood. For the case of solid wood, the reaction chamber preferably operates in a batch mode. For the case of wood elements, the reaction chamber, as opposed to reaction chambers used in batch acetylation processes, is preferably operated as continuous reactor. Although the different heating steps can be conducted in different reaction chambers placed in series, in an interesting embodiment, the reaction chamber is operated with two or more zones wherein different temperatures are applied. This is a suitable measure to optimize the application of heat to the wood elements in the course of the acetylation reaction. The heating steps in the process of the invention can be conducted each in a single zone, or one or more of the heating steps can involve two or more zones. Preferably, in the reaction two to five zones are applied. The skilled person will be able to determine, within the limits for the heating steps identified in the present invention, the desired heating regimen, i.e. the number of zones, the temperatures applied therein, and the effective residence time in each of these zones. It will be understood that the precise optimization depends on circumstances such as the type and shape of wood to be acetylated and the specific apparatus chosen for acetylation.

Suitable reactors include, but are not limited to, liquid or gas-phase reactors known in the art of wood acetylation. A gas-phase reactor is preferred. This type of reactor allows subjecting the impregnated wood at higher temperatures, whilst at relatively low pressures. As a result, the residence time in a gas-phase type reactor can generally be longer than in a liquid-type reactor, which is beneficial to the acetylation levels. Also, in a gas-phase reactor the wood are not prone to washing out of acetic acid. In case of a liquid-phase reactor (i.e., without separating of excess liquid from the impregnated particles) washing out of this acetic acid would result in lowering the acetic anhydride concentration in the surrounding acetylation fluid Also resins, as a desirable component of wood, are better retained in a gas-phase type reactor than in a liquid type reactor.

In order to be suitable for a desirable continuous operation, the reaction chamber is designed in such a way as to allow the input of impregnated wood elements, and the output of acetylated wood elements, to be continuous. This can be realised in various ways, controlled by gravitation, by mechanical forces, or both. Preferably, the wood elements are carried through following the principle of plug flow, which implies a "first-in-first-out" principle.

The reaction chamber may comprise a vertically arranged plug flow reactor through which the wood elements pass downwardly through a gaseous acetylation fluid. An example of simple gravitational flow is a reaction chamber that is tilted in the sense that the inlet is positioned higher than the outlet. As a result thereof, wood elements will flow, by gravitation, from the inlet to the outlet, whilst being subjected to acetylation conditions. An example of mechanical force is a reaction chamber comprising a screw conveyor serving to transport wood elements from the inlet to the outlet. In one embodiment, the transportation forces will be provided by a combination of mechanical forces exerted by a screw and gravitational forces provided by having an inlet at higher level than an outlet. Most preferably, a screw conveyor is employed having a substantially horizontal screw, as a result of which the transportation is fully controlled by the mechanically operated screw, and not affected by gravitation. Both single and multiple screw conveyors can be used.

The ratio of evaporation to reaction can be adjusted by the pressure level in the reaction chamber. A higher pressure at a certain reaction temperature means a lower evaporation rate at essentially the same reaction rate. Preferably the pressure inside the reaction chamber is maintained between −0.40 barg and 3 barg and more preferably between −0.2 barg and 1 barg and still more preferable between −0.1 and 0.5 barg.

In one embodiment the "first in first out" principle is fulfilled by using a screw conveyor filled with impregnated and separated from excess liquid wood elements. Due to the gentle rotation of the screw, preferably in a horizontal position, the wood elements are prevented from attrition. This results in good element quality during the process. In one embodiment the reactor contains a double, parallel screw conveyor in order to increase the effective volume of the reactor.

The temperature during the heating steps can be controlled by a heated gas loop, which contains a gas at least partially saturated with acetic anhydride and/or acetic acid or being superheated acetic acid and/or acetic anhydride. An inert gas means that it does not participate in the acetylation reaction and is preferably nitrogen, carbon dioxide, or flue gas. In another embodiment, the screw conveyor reactor comprises a screw axle and a conveyor casing and the temperature of the acetylation is controlled by heating the screw axle and/or the conveyor casing. In this embodiment, the impregnated wood elements are directly heated by the screw axle and/or the conveyor casing. This heating can be performed by steam, oil or electrically. In another embodiment the heating can be done by a combination of a heated gas loop, heating by the screw axle and by the conveyor casing.

After acetylation, the acetylated wood can be dried, e.g. in a conventional manner, or as described in WO 2013/139937.

Acetylated wood according to the present invention may usefully be refined and converted to board, such as medium density fibreboard, MDF, or oriented strand board, OSB, or particle board, which will possess the superior dimensional stability, durability, stability to ultra-violet light and thermal conductivity, compared with board derived from non-acetylated wood elements.

In another aspect, the invention provides a plant for the acetylation of wood, said plant comprising a contacting section, such as an impregnation section, and, downstream thereof, an acetylation reaction section, wherein the acetylation reaction section comprises three reaction zones connected in series, each of said reaction zones comprising a wood conveying device, wherein controls are provided allowing the independent setting of the temperature and pressure in each reaction zone. Further elements of the plant, are preferably in accordance with WO 2013/139937.

Preferably, the conveying device is a screw conveyor. This can be a single screw conveyor or a multiple screw conveyor.

In summary, the invention includes a process for the acetylation of wood, wherein the wood is impregnated with acetylation fluid and heated in stages. It is thereby secured that an acetylation reaction is conducted at a temperature above the boiling temperature of the acetylation fluid, at a stage where the impregnated wood is largely devoid of free acetylation fluid (i.e., acetylation fluid not retained in the wood matrix or in capillaries). Preferably, the process is conducted in a plant having conveyors, such as transportation screws, in the zones in which the separate heating steps are conducted.

The invention is illustrated by the following, non-limiting examples.

Example 1

Wood chips of Sitka Spruce/Lodgepole Pine (80%/20% w/w) are impregnated by a Bethel process with Acetic Anhydride/Acetic Acid mixture (90/10 w/w) at 40° C. The liquid content of the wood chips after this impregnation is between 180-200% (i.e., 1 kg of dry wood chips have been impregnated with 1.8-2 kg of the mentioned liquid mixture).

The impregnated chips are subjected to acetylation in the following steps. In a first heating step, the chips are heated to 131° C.; this is done in such a way that the liquid content of the wood chips during this first heating step is maintained. This first heating step takes 30 minutes at atmospheric pressure. After these 30 minutes the acetyl content (AC) as defined in the previous text has increased to 14.5%.

These chips then enter a second heating step—which also takes 30 minutes—wherein a gas loop for heating is set 15° C. higher than the dew point of the free liquid at ambient pressure. During these second 30 minutes the acetyl content of the wood chips is further increased to 17.8%; the liquid content of the wood chips has decreased to 29%. The temperature of the wood chips in this second step is typically raised to 135-140° C.

In a third heating step the chips are heated by a gas loop at ambient pressure with temperature setting of 170° C., for another 30 minutes. The liquid content at the end of step two is such that it allows for significant increase of the acetyl content to 20.8% at the end of this step three. This high acetyl content differs from prior art wood chips acetylation as in U.S. Pat. No. 5,608,501, where much lower acetyl contents are obtained. Such high acetyl contents as obtained from the process in the current example yields wood elements of durability class 1.

The liquid content of the wood chips at the end of heating step three is 12%. Removal of this residual liquid can be done by known dryer techniques, and is not a crucial part of this invention, which is relating to obtaining high acetyl contents within attractive residence times.

Example 2

Wood chips of Radiata Pine are impregnated by a Bethel impregnation process with Acetic Anhydride/Acetic Acid mixture (90/10 w/w) at 40° C. As in Example 1, acetylation of the impregnated chips is conducted in three heating steps.

The impregnated wood chips enter the first heating step with a gas loop temperature of 140° C. for 30 minutes, while spraying liquid Acetic Anhydride onto the chips during this first heating step (the amount sprayed over these 30 minutes is 1.2 kg of liquid spray per kg of wood chips). The process is running at atmospheric pressure.

The chips are subsequently heated by the second heating step with a gas loop temperature of 145° C. for 30 minutes. The liquid content of the wood chips at the end of this second heating step is 34% and the acetyl content at this stage is 18%.

In the third heating step the wood chips are heated by a gas loop of 170° C. for an additional 30 minutes. After this third heating step the wood chips have an acetyl content of 21.2%, with a liquid content of 13%.

Example 3 (Reference Example)

Wood chips of Sitka Spruce/Lodgepole Pine (80%/20% w/w) are impregnated by a Bethel impregnation process with Acetic Anhydride/Acetic Acid mixture (90/10 w/w) at 40° C.

The impregnated wood chips are heated in a one step process for 90 minutes with a gas loop temperature set at 170° C. at atmospheric pressure. The result of this acetylation process is that the wood chips are acetylated to an acetyl content of 18.8%, the resulting liquid content of the wood chips after this process is 6%.

The invention claimed is:

1. A process for the acetylation of wood, the process comprising the following steps:
   (a) providing wood with acetylation fluid;
   (b) subjecting the wood, in the presence of the acetylation fluid, to a first heating step so as to initiate acetylation, without substantial evaporation of acetylation fluid, to form impregnated wood;
   (c) subjecting the impregnated wood, as heated in said first heating step, to a second heating step so as to substantially remove a free fraction of the acetylation fluid, below or at the boiling temperature of free acetylation fluid;
   (d) subjecting the impregnated wood, as heated in said second heating step, to a third heating step, at a temperature above the boiling temperature of free acetylation fluid thereby furthering acetylation;
   wherein said first, second and third heating step are carried out at a pressure in the range of −0.4 barg to 3 barg.

2. A process according to claim 1, wherein the second heating step is conducted so as to obtain wood having a liquid content (LC) of 20-40% by weight.

3. A process according to claim 1, wherein the second heating step is conducted so as to obtain wood having a liquid content within a range from 10% below to 10% above the Fiber Saturation Point (FSP).

4. A process according to claim 1, wherein the first heating step is conducted simultaneously with providing the wood with acetylation fluid.

5. A process according to claim 1, wherein the step of providing the impregnated wood takes place prior to subjecting the impregnated wood to the first heating step.

6. A process according to claim 1, wherein the wood is in the form of wood elements.

7. A process according to claim 1, wherein the wood is in the form of wood chips with length of 5 mm to 75 mm, width of 5 mm to 50 mm and thickness of 1.5 mm to 25 mm, and wherein said first, second and third heating step are carried out at a pressure in the range of −0.2 barg to 1 barg.

8. A process according to claim 1, wherein the wood contains free liquid in an amount of less than 5 wt. % before entering said third heating step, wherein the free liquid is acetylation liquid that is not retained in capillaries of the wood or in the matrix of the wood, and further wherein less than 50% by weight of the acetylation fluid is evaporated in the first heating step, and wherein the second heating step involves evaporation of above 10% of the free acetylation fluid.

9. A process according to claim 8, wherein said first, second and third heating steps are carried out at a pressure in the range of −0.1 barg to 0.5 barg.

10. A process according to claim 9, wherein the wood as obtained from the second heating step has an acetyl content of at least 14%.

11. A process according to claim 10, wherein the wood as obtained from the second heating step has a liquid content of 20-40 wt. %.

12. A process for the acetylation of wood, the process comprising the following steps:

(a) providing a stream of impregnated wood at or below the boiling temperature of free acetylation fluid, said stream comprising an impregnated wood which contains substantially no free liquid, which has a Liquid Content (LC) 20-40 wt. % and which has an Acetyl Content (AC) of at least 14%;

(b) heating the stream of impregnated wood at a pressure in the range of −0.4 barg to 3 barg to a temperature above the boiling temperature of free acetylation fluid.

13. A process according to claim 12, wherein the wood has a temperature within a range of −5° C. to +30° C. relative to the dew point of the free bulk liquid.

14. A process according to claim 12, wherein the Liquid Content (LC) is 25-35 wt. % and one or more reaction zones are provided with a conveying device.

15. A process according to claim 12, wherein the Acetyl Content (AC) is 16-19%.

16. A process according to claim 12, wherein the wood is in the form of wood elements.

\* \* \* \* \*